United States Patent [19]

Mack

[11] 4,041,014

[45] Aug. 9, 1977

[54] NON-TOXIC STABILIZER FOR VINYL CHLORIDE RESINS

[75] Inventor: Gerry P. Mack, Jackson Heights, N.Y.

[73] Assignee: M&T Chemicals Inc., Greenwich, Conn.

[21] Appl. No.: 384,025

[22] Filed: July 30, 1973

Related U.S. Application Data

[63] Continuation-in-part of Ser. No. 29,760, April 27, 1970, abandoned, which is a continuation of Ser. No. 694,868, Jan. 2, 1968, abandoned.

[51] Int. Cl.² .................................................. C08K 5/58
[52] U.S. Cl. ............................. 260/45.75 S; 252/406
[58] Field of Search ................. 260/45.75 K; 252/406

[56] References Cited
U.S. PATENT DOCUMENTS

| 2,307,157 | 1/1943 | Quattlebaum et al. | 260/45.75 |
| 2,789,963 | 4/1957 | Hecker | 260/45.75 |
| 3,390,159 | 6/1968 | Katsumura et al. | 260/45.75 |
| 3,655,616 | 4/1972 | Freeze et al. | 260/45.75 |

Primary Examiner—V. P. Hoke
Attorney, Agent, or Firm—Robert P. Auber; Kenneth G. Wheeless; Robert Spector

[57] ABSTRACT

Polyvinyl chloride compositions suitable for use as food packaging materials are stabilized against the degradative effects of heat using a mixture of di-n-octyltin-S,S'-bis(isooctyl mercaptoacetate) and an oligomeric form of di-n-octyltin maleate wherein the weight ratio of the two component stabilizers is between 1:3 and 4:1, respectively. The combination of stabilizers imparts a greater degree of stabilization than can be achieved using either component at a concentration equal to that of the mixture, as evidenced by a delay in the appearance of severe discoloration during exposure to temperatures of 250° C. and higher.

6 Claims, No Drawings

NON-TOXIC STABILIZER FOR VINYL CHLORIDE RESINS

BACKGROUND OF THE INVENTION

This application is a continuation-in-part of co-pending application Ser. No. 29,760 filed April 27, 1970 and now abandoned which in turn is a continuation of Ser. No. 694,868 filed Janu. 2, 1968, now abandoned. The necessity for stabilizing polyvinyl chloride compositions to prevent resin degradation caused by heat and weathering has long been recognized in the art. The stabilization problem has been particularly troublesome when manufacturing rigid and semi-rigid polymer formulations which are processed at relatively high temperatures. Such resins have been stabilized using various organotin compounds.

Polyvinyl chloride containing resins have had only limited use in food packaging in the United States, although they have many characteristics indicating their desirability for such use. These characteristics include low price, easy processing characteristics, strength, suitability for preparation of attractive colored products which may be wholly or partially transparent, and the ability to prepare clear products which couple transparency with excellent clarity, i.e., clear glass-like products. In spite of the suitability of polyvinyl chloride resins for food packaging use and the known non-toxicity of the polymer components of the resin, they have had only limited use in food packaging because of the reported toxicity of the more effective polyvinyl chloride stabilizers, and particularly the lower alkyltin stabilizers. This problem is particularly difficult to solve with the rigid and semi-rigid formulations which require the organotin stabilizers in relatively high concentrations, e.g., over 1% and preferably about 2–3%. The problem has been compounded by the objectionable odor characteristic of the most effective organotin stabilizers, namely, the organotin sulphur compounds which have odors related to those from which they are derived.

Toxicity studies of organotin compounds have indicated that the di-n-octyltin compounds are relatively non-toxic. Recent extensive studies have determined that polyvinyl chloride containing resins can be stabilized with specified dioctyltin compounds to produce resins having sufficiently low toxicity to be approved for food packaging use. The ability to produce a stabilized non-toxic polyvinyl chloride containing resin using a specified compound as a stabilizer is dependent not only on the low-toxicity of the stabilizing compound, but upon the amount of the stabilizer compound that may be extracted from resin under the leaching conditions prevalent in many food packages. High liquid content food compositions and liquids used in food compositions or ingested as such, e.g., oils, may leach the stabilizer from the packaging. Useful stabilizers for food packaging must have little or no extractability under the service conditions contemplated, and must be non-toxic in the amounts that may be extracted.

Non-toxic stabilized polyvinyl chloride containing resins have recently been developed. One such stabilized resin utilizes di(n-octyl)tin S,S'-bis (isooctyl mercaptoacetate). Although such compositions are effective and useful in certain areas, they are characterized by a mercaptan odor. This is particularly noticeable in closed containers such as bottles where the food (liquid or solid) in the container may absorb the odor, imparting an undesirable odor and taste to the food. In addition, resins stabilized with this mercaptoacetate tend to form a slightly yellow product when extruded and blow molded at elevated temperatures. Another stabilized polyvinyl chloride containing resin for food packaging utilizes di(n-octyl)tin maleate as the stabilizer. Although such compositions are useful in many instances, they suffer from the disadvantage that it is also difficult to obtain stabilized clear resins having the desired high degree of transparency and clarity. The compositions also have an odor associated therewith found by some to be undesirable. Accordingly, there exists a need for PVC stabilizers which will provide superior stabilized polyvinyl chloride containing compositions suitable for food packaging use which are non-toxic and which do not have undesirble odor characteristics.

Surprisingly it has now been found that the foregoing two organotin compounds can be combined within a certain range of proportions to yield a stabilizer for vinyl chloride polymers which is superior to either of the components used alone at a cencentration equal to that of the mixture. The period of time during which the resin can be heated without evidence of discoloration is thereby significantly increased.

SUMMARY OF THE INVENTION

This invention provides a non-toxic vinyl chloride polymer composition stabilized against the deteriorative effects of heat wherein the stabilizer is present at a concentration of between 0.5 and 3%, based on the weight of said polymer, and consists of a homogeneous mixture containing (1) di-n-octyltin-S,S'-bis(isooctyl mercaptoacetate) and
(2) an oligomeric di-n-octyltin maleate of the general formula $[(n-C_8H_{17})_2SnC_4H_2O_4]_x$ wherein $x$ represents the average degree of polymerization and is an integer between 2 and 4, inclusive, the weight ratio of component (1) to component (2) being between 3:1 and 1:3, respectively, with the proviso that the concentration of component (2) is less than 1%, based on the weight of said polymer when the total stabilizer concentration exceeds 2% by weight.

For most service conditions the optimum ratio is 1:1 with a variation of about plus or minus 10%. For resin compositions requiring high temperature processing, particularly with limited air access, e.g., extruded and molded materials, the preferred ratios of the mercaptoacetate to the maleate are between 1:1 and 3:1. Food packaging prepared from film is preferably stabilized with a composition having a ratio between 1:3 and 1:1.

DESCRIPTION OF THE PREFERRED EMBODIMENTS OF THE INENTION

The resins used to produce the packages which are stabilized in accordance with the present invention contain at least one hompolymer or copolymer of vinyl chloride. The copolymers are those formed by the copolymerization of the vinyl chloride with other ethylenically unsaturated monomers. These include acrylates such as acrylic acid, ethyl acrylate, acrylonitrile, etc.; vinyl monomers such as styrene, vinyl acetate, etc.; maleates such as maleic acid, maleic anhydride, maleate esters, etc.; and olefinic monomers such as ethylene and propylene. The term "polyvinyl chloride containing resin" as used herein refers to resins containing a homopolymer or copolymer in which vinyl chloride is the major component.

The preferred vinyl chloride containing resins for use in the manufacture of stabilized resin for food packaging purposes are polyvinyl chloride, vinyl chloridevinyl acetate copolymers, vinyl chloride-fumaric acid copolymers, vinyl chloride-maleic acid copolymers, vinyl chloride-propylene copolymers, and vinyl chloride-ethylene copolymers.

Di(n-octyl)tin S,S'-bis(octyl mercaptoacetate) has the formula: $(n-C_8H_{17})_2Sn(SCH_2COOC_8H_{17})_2$.

The particularly preferred compound is di(n-octyl)tin S,S'-bis(isooctyl mercaptoacetate). The commercial product may be the pure compound or, more preferably composition containing between 94.8% and 98.2% by weight, and preferably between 96% and 97.4% of di(n-octyl)tin S,S'-bis(isooctyl mercaptoacetate); between about 1.8% and 5%, and preferably between about 2.3% and 4% of a total of mono-n-octyltin S,S',S"-tris(isooctyl mercaptoacetate) and tri(n-octyl)-tin S-isoctyl mercaptoacetate, preferably with the mono compound composing all or the majority of said total of the mono and tri compounds; up to 0.15% of di(2-ethylhexyl)tin S,S'-bis(isooctyl mercaptoacetate); up to a total of 0.1% of all other organotin compounds; and not more than ten parts per million of a total of arsenic, antimony and lead. This composition contains between 15.1 and 16.4% by weight, preferably about 15.9%, of tin; between 8.1 and 8.9 % of sulphur. The composition, a liquid, weighs about 8.9 pounds per gallon. It has a specific gravity of about 1.07. It has a maximum chlorine content of 0.5%, a pour point of less than 20° C. It is a slightly yellow liquid having a Gardner number of about 3.

The di(n—octyl)tin maleate is an oligomer exhibiting the general formula $(n-C_8H_{17})_2SnC_4H_2O_4)_x$, wherein x is an integer having an average value between 2 and 4. This preferred polymer is prepared by dissolving maleic anhydride in a hydrocarbon solvent such as heptane at temperatures between about 130° and 180° F. A di(n-—octyl)tin oxide composition containing between about 95% and 99% of said oxide and not more than 5% of a total of n-octylstannoic acid and bis[(tri-n-octyl)tin]oxide is then added and held at temperatures between about 150° and 200° F. for about a half hour. The product is cooled and a composition containing about 95% of the di(n-octyl)tin maleate polymer wherein x is between 2 and 4 is obtained. The remaining 5% of the composition is essentially the corresponding mono- and/or tri-n-octyl compound, with the mono-compound predominating. Several portions of compound made by this process were recrystallized, following which the value of x was determined to be in the range between 2 and 4. The melting points of the various samples were in the range between 93° and 97° C. The composition contains between 25.2 and 26.5% by weight of tin and has a saponification number between 225 and 255. The loss on drying (LOD) is 1% maximum. The compound contains a maximum of 10 parts per million of arsenic, antimony and lead, and is a white to cream colored crystalline solid.

The stabilized resin composition of this invention may also contain various additives including fillers, pigments, waxes, lubricating agents, plasticizers, used in amounts of up to about 15% in semi-rigids and 50 to 60% in film, are the non-toxic plasticizers such as butylbenzyl phthalate, dicyclohexyl phthalate, dihexyl phthalate, and di-2-ethylhexyl adipate. The resins used for preparing bottles may contain an impact modifying rubbery polymer, such as acrylonitrile-butadiene-styrene, or an acrylic ester with butadiene-styrene, commonly used in amounts between about 3 and 20%. The preferred anti-oxidents are the hindered phenols, and particularly 2,6-di-tert-butyl-p-cresol, which are used in very small amounts, e.g., 3 to 5% of the weight of the stabilizer.

The resin compositions can be prepared by milling, blending, or other commonly employed formulation technique which uniformly disperse all the components of the resin composition, and particularly the stabilizer, throughout the resin. Sheet or film products are commonly processed on rolls such as 2-roll differential speed mills. Semi-rigid and rigid products are also commonly formed by extrusion. Hollow products may be formed by various casting techniques and also by blow molding.

Even stabilized resins will eventually discolor when heated at temperatures between 100 and 300 ° C. for a prolonged period of time, however the interval of time until the first evidence of discoloration is observed is extremely important and it is most desirable to make this interval as long as possible. The reason for this is that in a commercial molding or extruding operation a significant percentage of the shaped articles produced will be defective for one reason or another. These reject articles are usually melt blended together with "virgin" resin and reshaped. In addition, considerable amounts of scrap often result from certain shaping operations. The scrap is also combined with virgin resin and reprocessed. It is conceivable that certain portions of a given formulation may be remelted and reshaped several times. An additional few minutes of stability may therefore make the difference between commercial success and failure for a given quantity of resin. By combining di-n-octyltin maleate with di-n-octyltin-S,S'-bis(isooctyl mercaptoacetate) in the proportions specified hereinbefore it is possible to extend the period of heating during which the resin remains substantially colorless without increasing the total stabilizer content. This is most desirable for a commercial-scale shaping operation.

Polyvinyl chloride containing compositions are stabilized so that they do not become discolored (or develop only an acceptable minimum of color) during processing. This discoloration is initially yellow and becomes progressively brown and black as the resin degrades. More severe processing conditions at higher temperature require a resin with greater stability.

EXAMPLES

The invention is further illustrated in the following examples. All parts and percentages herein are by weight based on 100 parts or precent of polymer.

Stabilized polyvinyl chloride compositions were prepared using 100 parts of a vinyl chloride homopolymer and a stabilizer content of 0.5, 2 and 3 parts by weight. The stabilizers evaluated were 1) Di-n-octyltin-S,S'-bis (isooctyl mercaptoacetate) 2) Di-n-octyltin maleate of the formula $[(n-C_8H_{17})_2SnC_4H_2O_4]_n$ wherein n represents the degree of polymerization, and is equal to between 2 and 4, and 3) mixtures of (1) and (2) as specified in the subsequent Tables. The resin composition containing 2 parts of stabilizer also included 15 parts of Blendex 401 (aterpolymer of acrylonitrile, butadiene and styrene), and 0.5 parts of glycerol monostearate. The purpose of the terpolymer was to improve the impact resistance of the resultant formulation. An impact modifier is often present in formulations which are subsequently shaped into bottles.

The components of each resin composition tested were blended using a 2-roll differential speed mill wherein the temperature of the rolls was 325° F. The composition was milled until a uniform sheet formed around one of the rollers. The sheet was then removed and cut into square samples measuring 1 inch (2.54 cm.) along each side. The test samples are placed in a circulating air oven maintained at a temperature of 375° F. The samples containing 2 parts of stabilizer were tested at 400° F. Representative test samples were withdrawn from the oven at specified intervals of time and the color of the samples was rated using the Gardner Color Scale which employs numbered colored glass discs against which the color of a given test sample is compared. The numbered scale ranges from 0 (water-white) to 20 (black). The color ratings are recorded in the following tables.

EXAMPLE I

This example demonstrates the improved heat stability imparted to a vinyl chloride homopolymer containing 0.5 part per 100 parts of polymer of the present combinations of di-n-octyltin-S,S'-bis(isooctyl mercaptoacetate (A) and an oligomeric di-n-octyltin maleate (B) wherein the degree of polymerization was 2-4.

| Stabilizer | Parts | Color Rating Following Heating at 375° F For X Minutes | | | | |
|---|---|---|---|---|---|---|
| | | X = 0 | 15 | 30 | 45 | 60 |
| A(control) | 0.5 | 0 | 8 | 17 | 19 | 20 |
| B(control) | 0.5 | 0 | 5 | 12 | 16 | 19 |
| A | 0.35 | 0 | 0 | 8 | 18 | 19 |
| B | 0.15 | | | | | |
| A | 0.15 | 0 | 0 | 6 | 17 | 18 |
| B | 0.35 | | | | | |

The data in the foregoing Table domonstrate that the present stabilizers delay the appearance of initial discoloration (no discoloration observed following 15 minutes of heating). In addition, the color observed after 30 minutes of heating is considerably better for both combinations than for either of the controls. As mentioned in a previous section of this specification, the delay in appearance of discoloration is unexpected, since it is not exhibited by the superior stabilizer (B) when used alone. This enhanced stabilization is particularly valuable in commercial scale shaping operations, where a significant amount of resin is recycled two or more times.

EXAMPLE II

This example demonstrates the enhanced degree of heat stability obtained using 2% of the present stabilizer compositions (based on polymer weight). In addition to polymer and stabilizer the composition also contains 15 parts of Blendex 401 (a terpolymer of acrylonitrile, butadiene and styrene) and 0.5 part of glycerol monostearate. The stabilizers in the following table are identified as described in Example I.

| Stabilizer | Parts | Color Rating Following Heating at 400° F For X Minutes | | | | | | |
|---|---|---|---|---|---|---|---|---|
| | | X = 0 | 5 | 10 | 15 | 20 | 25 | 30 |
| A(control) | 2 | 0 | 0 | 3 | 6 | 6 | 11 | 17 |
| B(control) | 2 | 1 | 1 | 1 | 3 | 8 | 14 | 15 |
| A | 0.5 | 0 | 0 | 0 | 1 | 2 | 9 | 13 |
| B | 1.5 | | | | | | | |
| A | 1.0 | 0 | 0 | 0 | 0 | 1 | 8 | 10 |
| B | 1.0 | | | | | | | |
| A | 1.5 | 0 | 0 | 0 | 1 | 2 | 8 | 10 |
| B | 0.5 | | | | | | | |

The foregoing data demonstrate that when employed at the 2% level, the present stabilizers delay the appearance of initial discoloration and also improve the long-term heat stability, as evidenced by the fact that after 30 minutes of heating the color ratings of the compositions containing the present stabilizers are 2 or 5 Gardner color units superior to the more effective stabilizer used along at the 2% level.

EXAMPLE III

This example demonstrates the improved stabilization obtained using 3 parts of the present compositions per 100 parts of resin. The component stabilizers are identified as defined in Example I.

| Stabilizer | Parts | Color Rating Following Heating at 375° F for X Minutes | | | | | | | | |
|---|---|---|---|---|---|---|---|---|---|---|
| | | X = 0 | 10 | 20 | 30 | 40 | 50 | 70 | 80 | 90 |
| A(control) | 3 | 0 | 0 | 1 | 2 | 2 | 4 | 9 | 17 | 19 |
| B(control) | 3 | 1 | 1 | 3 | 4 | 4 | 5 | 20 | 20 | 20 |
| A | 2.25 | 0 | 0 | 1 | 1 | 2 | 2 | 8 | 13 | 19 |
| B | 0.75 | | | | | | | | | |
| A | 0.75 | 0 | 1 | 2 | 2 | 3 | 4 | 7 | 9 | 12 |
| B | 2.25 | | | | | | | | | |
| A | 1.5 | 0 | 1 | 2 | 2 | 3 | 5 | 8 | 12 | 17 |
| B | 1.5 | | | | | | | | | |

At a level of 3% (based on weight of polymer) the ability of polymer compositions to withstand long periods of heating, i.e. 70 minutes without undergoing severe discoloration is enhanced using the present stabilizers. In addition, there is evidence that initial discoloration is being retarded, in that the color ratings observed following 30 minutes of heating for the test samples containing the present stabilizers are at least as good as the ratings for the superior control sample.

All of the compositions and products in the examples have non-toxic properties and are suitable for use in food packaging. As a general rule, greater stability is obtained with increasing amounts of stabilizer within the range specified. The preferred range of between two and three parts of stabilizer encompasses the more severe commercial processing systems and service characteristics. Smaller amounts of stabilizer may be used to meet less exacting requirements.

Similar excellent stabilized polyvinyl chloride containing resins are obtained using the specified stabilizer compositions with resins other than those examplified, such as vinylidene chloride, vinyl chloride-vinyl acetate copolymers, vinyl chloride-fumaric acid copolymers, vinyl chloride-maleic acid copolymers, and vinyl chloride-ethylene copolymers.

The foregoing examples illustrate the excellent heat stability of the resins stabilized with the stabilizer compositions of the present invention. Particularly impressive results are obtained when producing clear transparent products. As noted in the examples, although resins stabilized with the mercaptoacetate have excellent heat stability, clear samples may have a light yellow tinge. Similarly resins stabilized with the maleate polymer often result in a sheet having a slight haze, i.e., the sheet does not exhibit excellent clarity. Unexpectedly, the stabilizer compositions of the present invention which combine the mercaptoacetate and the maleate produce stabilized resins having a water-white color with excellent heat stability. It is most unexpected that the stabilizer compositions containing a combination of the two materials are more effective than equivalent amount of either material and in fact produce results that neither of the two materials can produce alone.

Stabilized resins manufactured with the stabilizer compositions of the present invention have little, if any, odor as noted in the examples. The odor, if any is present, is not unpleasant, and does not cause undesirable taste in food. This is also most unexpected since the mercaptoacetate component of the resin has a sulphur(-mercapto) type odor, and the maleate component has an odor with some unpleasant characteristics.

Although this invention has been illustrated by reference to specific examples, changes therein which clearly fall within the scope of the invention will be apparent to those skilled in the art. It is, therefore, to be limited solely by the scope of the appended claims.

What is claimed is:

1. A non-toxic stabilized polyvinyl chloride containing resin composition having desirable odor characteristics consisting essentially of a homopolymer or copolymer of at least one resin selected from the group consisting of polyvinyl chloride, vinyl chloride-vinyl acetate copolymers, vinyl chloride-fumaric acid copolymers, vinyl chloride-maleic acid copolymers, vinyl chloride-propylene copolymers, and vinyl chloride-ethylene copolymers, and containing between 1% and 3%, by weight based on the weight of polymer in said resin composition, of (A) a sulfur-containing stabilizer composition comprising between 94.8% and 98.2% by weight of di(n-octyl)tin S,S'bis(isooctyl mercaptoacetate), between 1.8% and 5% of a total of (1) mono-n-octyltin S,S'S''-tris(isooctyl mercaptoacetate) and (2) tri(n-octyl)tin S-isooctyl mercaptoacetate, up to 1.5% of di(2-ethylhexyl)tin S,S'-bis(isooctyl mercaptoacetate), said sulfur-containing stabilizer composition containing between 15.1% and 16.4% of tin and between 8.1 and 8.9% of sulfur, and (B) a di)n-octyl)tin maleate polymer having the formula $[(n-C_8H_{17})_2SnC_4H_2O_4]_x$, wherein $x$ is an integer selected from the group consisting of 2, 3, and 4, said maleate polymer having a melting point between about 93° C. and 97° C. and containing between 25.2 and 26.5% of tin; the weight ratio of said mercaptoacetate and said maleate being more than 2 parts by weight of said mercaptoacetate per part of said maleate up to a ratio of about 4:1.

2. A clear transparent bottle consisting of the stabilized resin of claim 1 wherein said polyvinyl chloride containing resin is a polyvinyl chloride homopolymer, or a vinyl chloride-propylene copolymer with the vinyl chloride being at least 90% of said copolymer.

3. A stabilizer composition suitable for preparing heat stable polyvinyl chloride homopolymer and copolymer resins useful as a food packaging material consisting of (1) di(n-octyl)tin S,S'-bis(isooctyl mercaptoacetate) and (2) di(n-octyl)tin maleate, of the general formula $[(n-C_8H_{17})_2SnC_4H_2O_4]_x$, wherein $x$ is an integer between 2 and 4, inclusive, said composition containing more than twice the weight of said mercaptoacetate relative to said maleate up to a weight ratio of about 4:1.

4. The stabilizer composition of claim 3 wherein said ratio of said mercaptoacetate to said maleate is 3:1.

5. A stabilizer composition suitable for preparing heat-stable polyvinyl chloride homopolymer and copolymer resins useful as a food packaging material consisting of a sulfur-containing composition comprising between 94.8 and 98.2% by weight of di)n-octyl)tin S,S'-bis(isoctyl mercaptoacetate), between 1.8 and 5% of a total of (1) mono-n-octyltin S,S',S''-tris(isooctyl mercaptoacetate) and (2) tri(n-octyl)tin S-isooctyl mercaptoacetate, up to 0.15% of di(2-ethylhexyl)tin S,S'-bis(isooctyl mercaptoacetate), said sulfur-containing composition containing between 15.1 and 16.4% of tin and between 8.1 and 8.9% of sulfur; and a di(n-octyl)tin maleate polymer, said maleate polymer having a melting point between about 93° C. and 97° C. and containing between 25.2 and 26.5% of tin; said stabilizer composition containing more than 2 parts of said sulfur-containing composition per part of said maleate up to a weight ratio of 4:1.

6. The stabilizer composition of claim 5 wherein said ratio is 3:1.

* * * * *